United States Patent
Tsukahara et al.

(10) Patent No.: US 9,796,234 B2
(45) Date of Patent: Oct. 24, 2017

(54) SHOCK ABSORBER

(71) Applicant: Showa Corporation, Gyoda-shi (JP)

(72) Inventors: Takashi Tsukahara, Gyoda (JP); Tomohiro Miyazaki, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/067,975

(22) Filed: Mar. 11, 2016

(65) Prior Publication Data
US 2016/0280031 A1  Sep. 29, 2016

(30) Foreign Application Priority Data
Mar. 25, 2015 (JP) .................. 2015-063408

(51) Int. Cl.
| | |
|---|---|
| F16F 9/34 | (2006.01) |
| B60G 13/08 | (2006.01) |
| F16F 9/19 | (2006.01) |
| F16F 9/348 | (2006.01) |
| F16F 9/18 | (2006.01) |

(52) U.S. Cl.
CPC .............. B60G 13/08 (2013.01); F16F 9/18 (2013.01); F16F 9/19 (2013.01); F16F 9/3485 (2013.01); B60G 2202/24 (2013.01)

(58) Field of Classification Search
CPC ........ F16F 9/18; F16F 9/34; F16F 9/50; F16F 9/504; F16F 9/5126
USPC ................................... 188/280, 282.5–282.9
See application file for complete search history.

(56) References Cited

U.S. PATENT DOCUMENTS

| | | | |
|---|---|---|---|
| 7,611,000 B2 | 11/2009 | Naito | |
| 8,590,680 B2 * | 11/2013 | Maeda | F16F 9/34 188/282.8 |
| 2011/0186393 A1 * | 8/2011 | Maeda | F16F 9/3488 188/280 |
| 2011/0214955 A1 * | 9/2011 | Maeda | F16F 9/34 188/280 |
| 2015/0362038 A1 * | 12/2015 | Kim | F16F 9/3488 188/280 |

FOREIGN PATENT DOCUMENTS

JP     2011-043220 A     3/2011

* cited by examiner

*Primary Examiner* — Christopher Schwartz
(74) *Attorney, Agent, or Firm* — Leason Ellis LLP (57) ABSTRACT

A hydraulic shock absorber includes a cylinder, a piston ring, a first valve seat forming an extension side oil path, a first valve opening and closing the extension side oil path, a second valve seat forming an inner-side channel through which oil flows separately from a flow of the oil causing the first valve to open the extension side oil path, a second valve opening and closing the inner-side channel, a spool provided to press the second valve toward the inner-side channel, a base member holding the spool, and an axially-movable free piston forming a back pressure chamber communicating with the inner-side channel and that houses the oil between the spool and the base member.

12 Claims, 8 Drawing Sheets

SHOCK ABSORBER

CROSS-REFERENCE TO RELATED APPLICATION(S)

This application claims priority from Japanese Patent Application No. 2015-063408 filed on Mar. 25, 2015, the entire contents of which are incorporated herein by reference.

BACKGROUND

1. Field

The present invention relates to a shock absorber that absorbs shock using a liquid.

2. Related Art

A suspension apparatus in a vehicle such as an automobile includes a shock absorber that appropriately damps vibration transmitted from a road surface to a vehicle body during traveling in order to improve riding comfort and operational stability. Such shock absorber may enable a change in a damping force to be exerted, according to conditions (see, for example, Japanese Patent Application Laid-open No. 2011-43220).

SUMMARY

An aspect of the present invention provides a shock absorber including a cylinder housing a liquid, a partitioning portion that is provided in the cylinder so as to be movable in an axial direction of the cylinder and partitions a space in the cylinder into a first liquid chamber and a second liquid chamber, a first channel forming portion forming a first channel through which the liquid flows in conjunction with movement of the partitioning portion, a first valve opening and closing the first channel in the first channel forming portion, a second channel forming portion forming a second channel through which the liquid flows separately from a flow of the liquid causing the first valve to open the first channel in conjunction with movement of the partitioning portion, a second valve opening and closing the second channel in the second channel forming portion, a pressing portion provided so as to be movable in contact with the second valve and presses the second valve toward the second channel, a holding portion holding the pressing portion, and a moving portion forming, between the pressing portion and the holding portion, a housing chamber that communicates with the second channel and that houses the liquid, the moving portion being provided so as to be movable in the axial direction with respect to the pressing portion and the holding portion.

The moving portion forms the housing chamber along with the pressing portion and the holding portion and is provided so as to be movable, enabling a change in a damping force to be exerted, using a simple configuration.

According to the aspect of the present invention, a shock absorber that enables a change in a damping force to be exerted can be realized with a simple configuration.

DESCRIPTION OF EMBODIMENTS

Embodiments will be described below with reference to the attached drawings.

Embodiment 1

Figure 1:
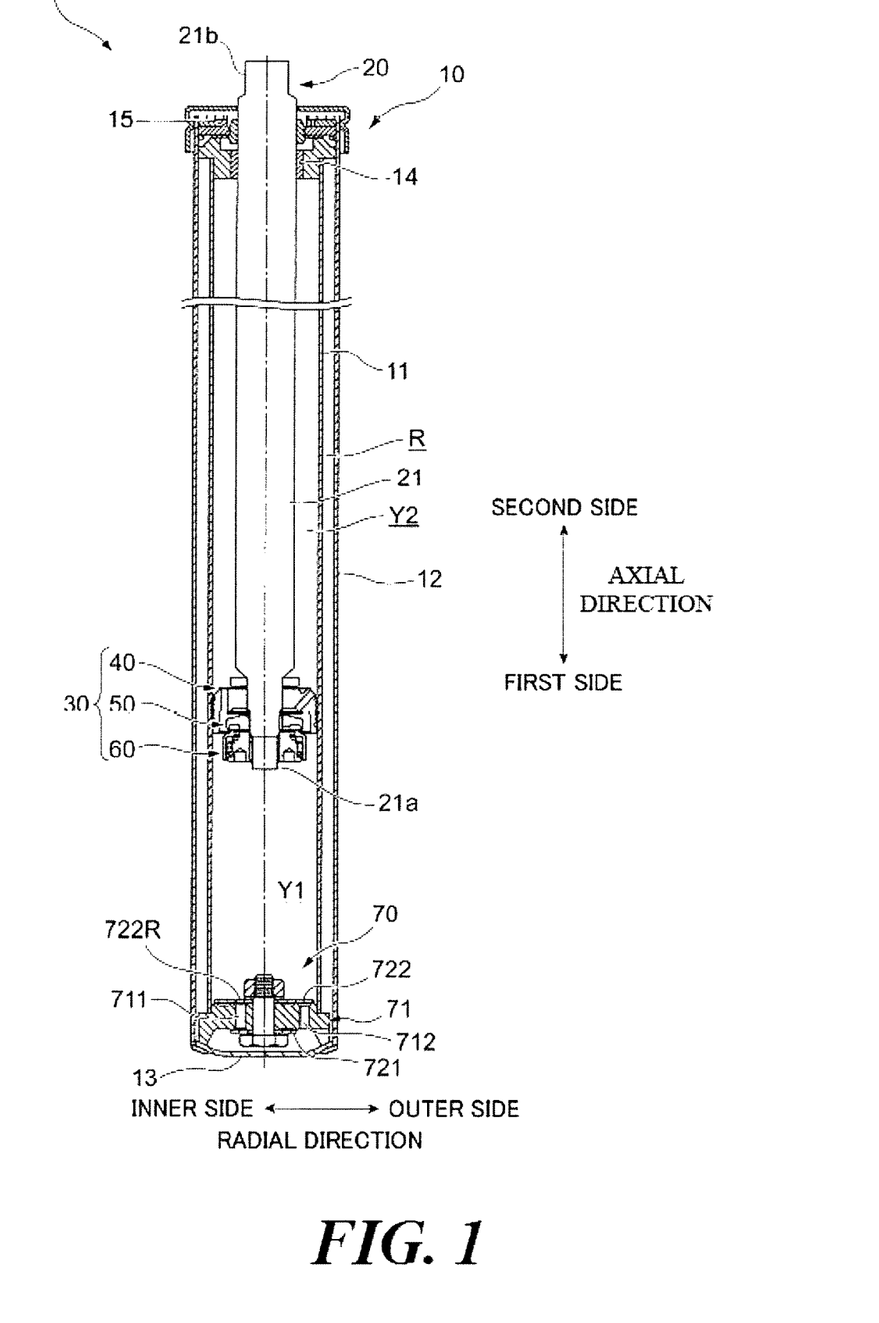
FIG. 1 is a diagram depicting a general configuration of a hydraulic shock absorber in Embodiment 1.

FIG. 1 is a diagram of a general configuration of a hydraulic shock absorber 1 in Embodiment 1.

Figure 2:
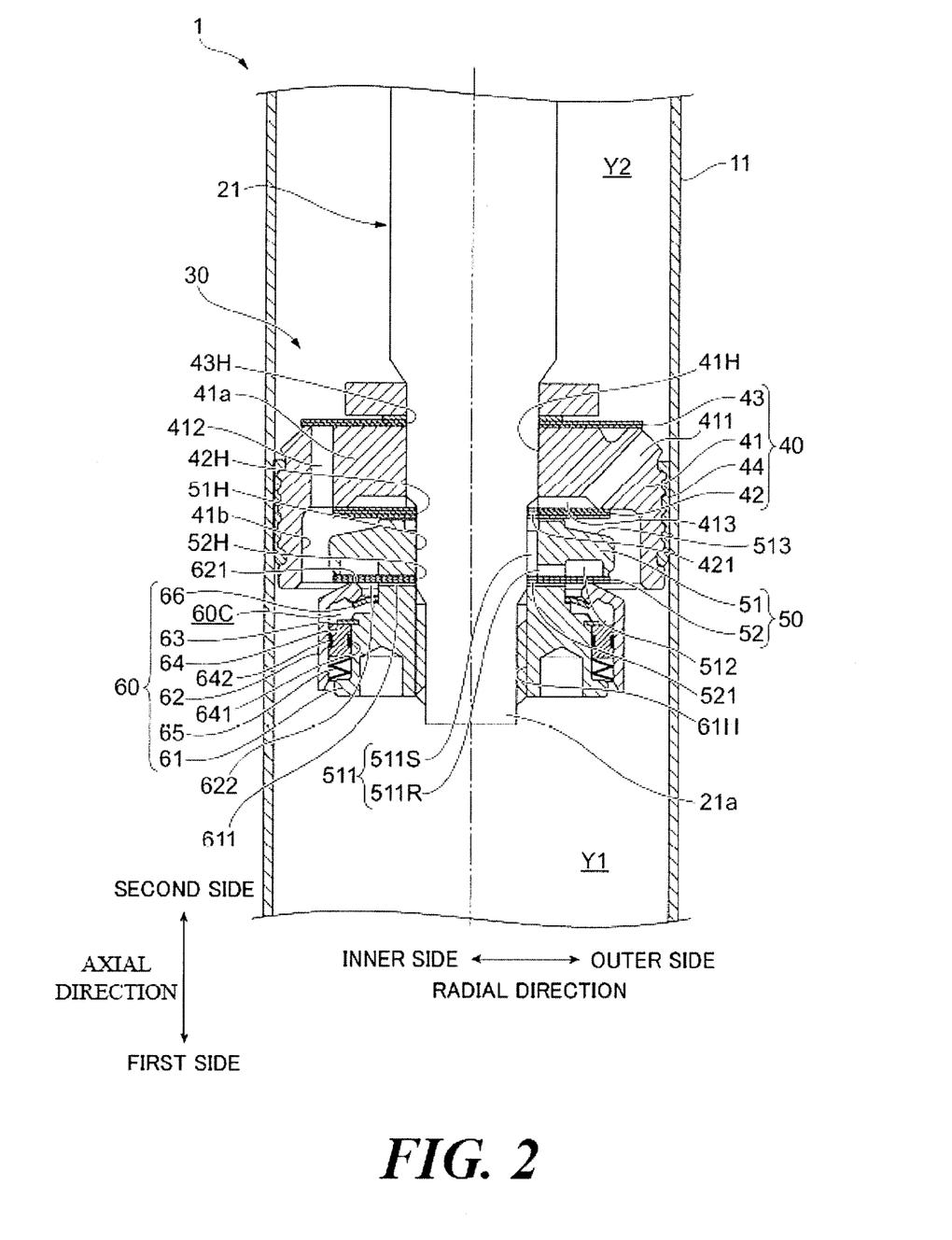
FIG. 2 is a sectional view of a piston portion in Embodiment 1.

FIG. 2 is a sectional view of a piston portion 30 in Embodiment 1.

A lower side in an axial direction of the hydraulic shock absorber 1 shown in FIG. 1 is hereinafter referred to as a "first side", and an upper side in the axial direction is hereinafter referred to as a "second side". A central axis side in a radial direction of the hydraulic shock absorber 1 is hereinafter referred to as an "inner side in the radial direction". An outer side in the radial direction of the hydraulic shock absorber 1 is hereinafter referred to as an "outer side in the radial direction".

<Configuration and Functions of the Hydraulic Shock Absorber 1>

As depicted in FIG. 1, the hydraulic shock absorber 1 (shock absorber) includes a cylinder portion 10, a rod portion 20 that protrudes, on a second side thereof, to the exterior of the cylinder portion 10 and that is, on a first side thereof, slidably inserted into the cylinder portion 10, a piston portion 30 provided at a first-side end of the rod portion 20, and a bottom valve portion 70 arranged at a first-side end of the cylinder portion 10.

The hydraulic shock absorber 1 is provided between a vehicle body and an axle in, for example, a four-wheeled vehicle or a two-wheeled vehicle to damp amplitude motion of the rod portion 20 with respect to the cylinder portion 10.

The cylinder portion 10 includes a cylinder 11, an outer cylinder 12 provided outside the cylinder 11, and a bottom portion 13 provided at a first-side end of the outer cylinder 12. In the present embodiment, a reservoir chamber R in which oil is stored is formed between the cylinder 11 and the second cylinder 12.

The cylinder portion 10 has a rod guide 14 provided at a second-side end of the cylinder 11 and a seal member 15 that closes a second-side end of the outer cylinder 12.

In the present embodiment, the rod portion 20 has a rod member 21 formed to extend in the axial direction, a first-side attachment portion 21*a* provided at a first-side end of the rod member 21, and a second-side attachment portion 21*b* provided at a second-side end of the rod member 21.

The first-side attachment portion 21*a* of the rod member 21 holds the piston portion 30. A coupling member (not depicted in the drawings) is attached to the second-side attachment portion 21*b* of the rod member 21 and used to couple the hydraulic shock absorber 1 to, for example, a vehicle body of an automobile.

The piston portion 30 includes a first piston portion 40 provided on a second side of the piston portion 30, a second piston portion 50 provided on a first side of and inside the first piston portion 40, and a damping force adjustment portion 60 provided on a first side of the second piston portion 50.

In the present embodiment, a piston ring 44 (see FIG. 2) of the first piston portion 40 partitions oil in a space in the cylinder 11 into a first oil chamber Y1 and a second oil chamber Y2. The first oil chamber Y1 is formed on the first side of the piston ring 44. The second oil chamber Y2 is formed on the second side of the piston ring 44.

Configurations of the first piston portion 40, the second piston portion 50, and the damping force adjustment portion 60 will be described below in detail.

The bottom valve portion 70 includes a valve body 71 having a plurality of bottom compression side oil paths 711 penetrating the bottom valve portion 70 in the axial direction and a plurality of bottom extension side oil paths 712 located outside the bottom compression side oil paths 711 in the radial direction and penetrating the bottom valve portion 70 in the axial direction, a compression side valve 721 provided on the first side of the valve body 71, and an extension side valve 722 provided on the second side of the valve body 71. The extension side valve 722 has oil holes 722R at positions corresponding to the bottom compression side oil paths 711 in the radial direction.

The bottom valve portion 70 is provided at a first-side end of the hydraulic shock absorber 1 to partition the first oil chamber Y1 from the reservoir chamber R.

A general configuration of the hydraulic shock absorber 1 according to the present embodiment will be described.

As depicted in FIG. 2, the hydraulic shock absorber 1 (a shock absorber) includes the cylinder 11 (cylinder) that houses oil (liquid), the piston ring 44 (partitioning portion) provided in the cylinder 11 so as to be movable in the axial direction of the cylinder 11 and partitioning the space in the cylinder 11 into the first oil chamber Y1 (first liquid chamber) and the second oil chamber Y2 (second liquid chamber), the first valve seat 41 (first channel forming portion) that forms an extension side oil path 411 (first channel) through which the oil flows in conjunction with movement of the piston ring 44, an extension side damping valve 42 (first valve) that opens and closes the extension side oil path 411 in the first valve seat 41, a second valve seat 51 (second channel forming portion) that forms an inner-side channel 511 (second channel) through which the oil flows separately from a flow of the oil causing the extension side damping valve 42 to open the extension side oil path 411, a second valve 52 (second valve) that opens and closes the inner-side channel 511 in the second valve seat 51, a spool 62 (pressing portion) provided so as to be movable in contact with the second valve 52 and pressing the second valve 52 toward the inner-side channel 511, a base member 61 (holding portion) that holds the spool 62, and a free piston 64 (moving portion) that forms, between the spool 62 and the base member 61, a back pressure chamber 60C (housing chamber) that communicates with the inner-side channel 511 and that houses the oil, the free piston 64 being provided so as to be movable in the axial direction with respect to the spool 62 and the base member 61.

These components will be described below in detail.

[Configuration and Functions of the Piston Portion 30]
[First Piston Portion 40]

As depicted in FIG. 2, the first piston portion 40 has the first valve seat 41, the extension side damping valve 42 provide on the first side of the first valve seat 41, and a compression side damping valve 43 provided on the second side of the first valve seat 41, and the piston ring 44 provided outside the first valve seat 41 in the radial direction.

(First Valve Seat 41)

The first valve seat 41 is a member shaped like a bottomed cylinder. The first valve seat 41 has a channel forming portion 41a formed on the second side of the first valve seat 41 and an opening 41b formed on the first side of the channel forming portion 41a.

The channel forming portion 41a includes a plurality of the extension side oil paths 411, a plurality of compression side oil paths 412, and a first annular recessed portion 413 formed on the first side of the channel forming portion 41a.

The extension side oil paths 411 are formed outside a through-hole 41H in the radial direction so as to obliquely penetrate the channel forming portion 41a. The compression side oil paths 412 are formed outside the through-hole 41H in the radial direction so as to penetrate the channel forming portion 41a in the axial direction. The first annular recessed portion 413 is annularly shaped so as to be recessed toward the second side.

In the present embodiment, the opening 41b internally houses the extension side damping valve 42 and the damping force adjustment portion 60.

(Extension Side Damping Valve 42)

The extension side damping valve 42 is a disc-like metal material having an opening 42H through which the first-side attachment portion 21a of the rod member 21 is passed. The extension side damping valve 42 is pressed toward the first-side end of the first valve seat 41. The extension side damping valve 42 enables a first side of the extension side oil paths 411 in the first valve seat 41 to be opened and closed, and constantly opens a first side of the compression side oil paths 412.

The extension side damping valve 42 has a first inner-side orifice 421 at a part of the opening 42H in a circumferential direction. In the present embodiment, the first inner-side orifice 421 is shaped like a cutout extending in the radial direction. The first inner-side orifice 421 lies opposite an axial channel 511S described below on the first side and opposite the first annular recessed portion 413 on the second side.

(Compression Side Damping Valve 43)

The compression side damping valve 43 is a disc-like metal material having an opening 43H through which the first-side attachment portion 21a of the rod member 21 is passed. The compression side damping valve 43 is pressed toward a second-side end of the first valve seat 41. The compression side damping valve 43 constantly opens a second side of the extension side oil paths 411 in the first valve seat 41 and enables a second side of the compression side oil paths 412 to be opened and closed.

(Piston Ring 44)

The piston ring 44 is provided in contact with slidable contact with an inner peripheral surface of the cylinder 11. The piston ring 44 reduces frictional resistance between the first valve seat 41 and the cylinder 11.

[Second Piston Portion 50]

As depicted in FIG. 2, the second piston portion 50 has the second valve seat 51 and the second valve 52 provided on the first side of the second valve seat 51.

(Second Valve Seat 51)

The second valve seat 51 has a through-hole 51H through which the first-side attachment portion 21a of the rod member 21. The second valve seat 51 has an inner-side channel 511 formed on an inner side of the second valve seat 51 in the radial direction, a second annular recessed portion 512 formed at a first-side end of the second valve seat 51, and a tapered portion 513 formed on the second side of the second valve seat 51.

The inner-side channel 511 has an axial channel 511S formed in the axial direction and a radial channel 511R formed in the radial direction. The axial channel 511S communicates with the radial channel 511R on the first side of the axial channel 511S. The axial channel 511S communicates with the first inner-side orifice 421 of the extension side damping valve 42 on the second side of the axial channel 511S. The radial channel 511R communicates with the axial channel 511S on an inner side of the radial channel 511R in the radial direction. The radial channel 511R communicates with the second annular recessed portion 512 on an outer side of the radial channel 511R in the radial direction. In other words, in the present embodiment, the inner-side channel 511 (second channel) communicates with extension side oil paths 411 (first channel) in the first valve seat 41 via the first inner-side orifice 421 (opening).

The second annular recessed portion 512 is annularly shaped so as to be recessed toward the second side thereof.

The tapered portion 513 is inclined toward the first side thereof from an inner side to an outer side of the tapered portion 513 in the radial direction. When the extension side damping valve 42 opens the extension side oil paths 411, the tapered portion 513 provides a space in which the extension side damping valve 42 is deformed toward the first side.

(Second Valve 52)

The second valve 52 is a disc-like metal member having an opening 52H through the first-side attachment portion 21a of the rod member 21 is passed.

The second valve 52 is pressed by the first-side end of the second valve seat 51. The second valve 52 enables the second annular recessed portion 512 of the second valve seat 51 to be opened and closed. In other words, the second valve 52 permits or blocks a flow of the oil through the inner-side channel 511 and the second annular recessed portion 512.

The second valve 52 has a second inner-side orifice 521 at a part of the opening 52H in the circumferential direction. The second inner-side orifice 521 is shaped like a cutout extending in the radial direction. The second inner-side orifice 521 communicates with a base member channel 611 described below on the first side and with the inner-side channel 511 on the second side.

(Damping Force Adjustment Portion 60)

As depicted in FIG. 2, the damping force adjustment portion 60 has the base member 61, the spool 62 provided outside the base member 61 in the radial direction, a stopper 63 provided on the base member 61, the free piston 64 provided between the spool 62 and the base member 61, a wave washer 65 provided on the first side of the free piston 64, and a preload spring 66 provided on the second side of the damping force adjustment portion 60 between the base member 61 and the spool 62.

(Base Member 61)

The base member 61 has a through-hole 61H through which the first-side attachment portion 21a of the rod member 21 is passed. The through-hole 61H has an internal thread and connects to an external thread formed on the first-side attachment portion 21a. In the present embodiment, the base member 61 allows the rod member 21 to hold the first piston portion 40 and the second piston portion 50.

The base member 61 has, at a second-side end thereof, a base member channel 611 extending in the radial direction. The base member channel 611 communicates with the second inner-side orifice 521 on an inner side of the base member channel 611 in the radial direction and with an opening 622 described below of the spool 62 on an outer side of the base member channel 611 in the radial direction.

(Spool 62)

The spool 62 is a member shaped generally like a cylinder. The spool 62 is provided so as to be movable relative to the base member 61 and the free piston 64. In the present embodiment, the spool 62 moves in the axial direction of the cylinder 11.

The spool 62 has a contact portion 621 provided on the second side of the spool 62 and an opening 622 formed on an inner side of the spool 62 in the radial direction. The contact portion 621 contacts the second valve 52 on the second side thereof to form an area against which the second valve 52 is pressed. The opening 622 forms a gap through which the oil can flow, between the opening 622 and the base member 61. The opening 622 functions as an oil inlet of the back pressure chamber 60C described below.

(Stopper 63)

The stopper 63 is an annularly shaped member. In the present embodiment, the stopper 63 is fixed to the base member 61. The stopper 63 contacts the free piston 64 to regulate a moving position on the second side of the free piston 64.

(Free Piston 64)

The free piston 64 is a member shaped like a ring. The free piston 64 is provided outside the base member 61 and inside the spool 62. That is, the free piston 64 is attached between the base member 61 and the spool 62. The free piston 64 is arranged in juxtaposition with the base member 61 and the spool 62 in a direction crossing the axial direction of the cylinder 11 (orthogonal direction). The free piston 64 is provided so as to be movable relative to the base member 61 and the spool 62. In the present embodiment, the free piston 64 moves in the axial direction of the cylinder 11.

In the present embodiment, an inner side seal member 641 and an outer side seal member 642 are attached to an inner periphery and an outer periphery, respectively, of the free piston 64. The inner side seal member 641 seals the free piston 64 and the base member 61 so as to eliminate the gap between the free piston 64 and the base member 61. The outer side seal member 642 seals the free piston 64 and the spool 62 so as to eliminate the gap between the free piston 64 and the spool 62.

The free piston 64 is configured not to be deformed upon being moved as described below. A material for the free piston 64 may be metal or the like.

In the present embodiment, the back pressure chamber 60C in which the oil is contained is defined by the outer side of the base member 61, the inner side of the spool 62, and the second side of the free piston 64. The oil in the second oil chamber Y2 flows into the back pressure chamber 60C using, as channels, the opening 622, the base member channel 611, the second inner-side orifice 521, the axial channel 511S, the first inner-side orifice 421, the first annular recessed portion 413, and the extension side oil paths 411.

The volume of the oil in the back pressure chamber 60C changes according to the positions of the spool 62 and the free piston 64, configured to be movable as described above, relative to the base member 61.

(Wave Washer 65)

The wave washer 65 is an elastically deformable member. The wave washer 65 engages with the base member 61 on the first side and contacts the free piston 64 on the second side. The wave washer 65 presses the free piston 64 toward the second side by a predetermined spring force.

The present invention is not limited to the wave washer 65 in the present embodiment. Any other elastic member may be used as long as the elastic member allows the free piston 64 to be pushed toward the second side.

(Preload Spring 66)

The preload spring 66 has protrusion portions having an annular outside diameter and protruding outward in the radial direction and discretely in the circumferential direction. The preload spring 66 contacts the spool 62 on a second-side surface thereof and contacts the base member 61 on a first-side surface thereof. The preload spring 66 presses the spool 62 toward the second side. The preload spring 66 enables the oil to flow between the first side and second side of the preload spring 66.

<Operations of the Hydraulic Shock Absorber 1>

Figure 3A:
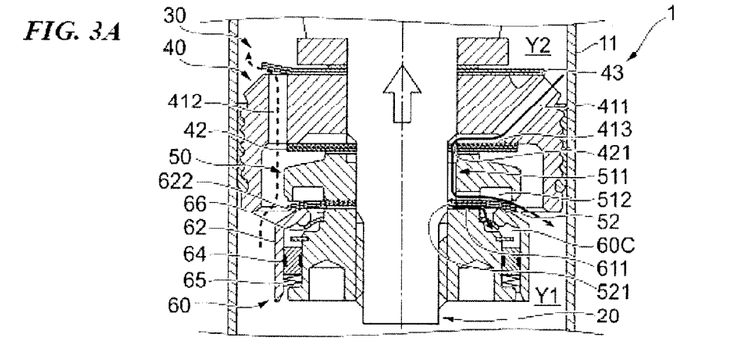
FIGS. 3A to 3C are diagrams illustrating operations of the hydraulic shock absorber in Embodiment 1.
Figure 3B:
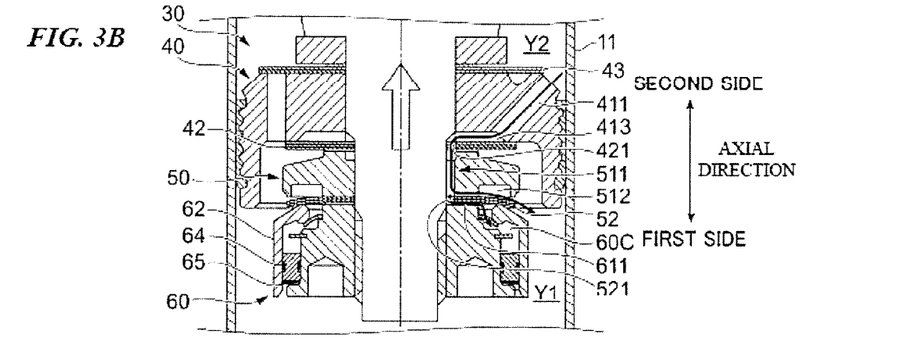
Figure 3C:
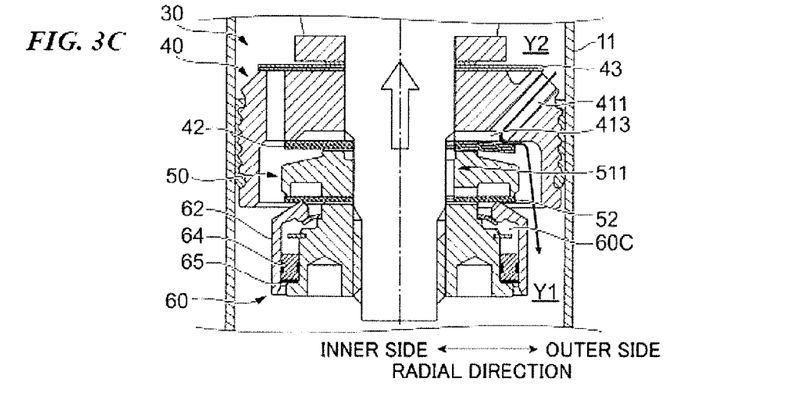

FIGS. 3A to 3C are diagrams illustrating operations of the hydraulic shock absorber 1 in Embodiment 1.

A flow of the oil during an extension stroke of the hydraulic shock absorber 1 will be described.

Two cases of movement of the piston portion 30 (rod member 20) with respect to the cylinder 11 will be described: the case where the piston portion 30 moves at a low frequency and the case where the piston portion 30 moves at a high frequency.

(Low Frequency)

First, the case where the piston portion 30 moves at a low frequency will be described. As depicted in FIG. 3A, the piston portion 30 moves toward the second side in the axial direction of the cylinder 11 as depicted by a blank arrow. Then, movement of the piston portion 30 pushes the oil in the second oil chamber Y2 to elevate the pressure in the second oil chamber Y2.

The oil in the second oil chamber Y2 flows through the extension side oil paths 411 into the first annular recessed portion 413. The oil in the first annular recessed portion 413 further flows through the first inner-side orifice 421 and the inner-side channel 511 into the second annular recessed portion 512. The oil flows into the first oil chamber Y1 while opening the second valve 52.

The spool 62 is in contact with the second valve 52. However, the spool 62 is provided so as to be movable. In this state, the contact of the second valve 52 causes the spool 62 to move toward the first side.

As depicted in FIG. 3A, a portion of the oil flowing through the inner-side channel 511 also flows into the back pressure chamber 60C through the second inner-side orifice 521. The oil flowing into the back pressure chamber 60C moves the free piston 64 toward the first side while contracting the wave washer 65. At the low frequency, the free piston 64 is kept moving toward the first side. As long as the state is maintained where a large volume of the oil is present in the back pressure chamber 60C, the pressure in the back pressure chamber 60C is lower than the pressure of the oil on the second side of the second valve 52. Thus, the spool 62 is moved toward the first side.

At the low frequency, in the hydraulic shock absorber 1 in the present embodiment, the extension side damping valve 42 keeps the extension side oil paths 411 closed. That is, at the low frequency, a flow of the oil occurs which moves through the extension side oil paths 411 while opening the extension side damping valve 42 so as to bypass an original flow of the oil.

When the flow of the oil stops which allows the second valve 52 to be opened, the spool 62 moves toward the second side to the original position by the action of the preload spring 66.

(High Frequency)

Subsequently, a case will be described where the piston portion 30 moves at a high frequency.

A basic flow of the oil at the high frequency is the same as the basic flow of the oil at the low frequency described above. However, operations of the free piston 64, the spool 62, and the second valve 52 at the high frequency are different from the operations at the low frequency depending on the state of the oil flowing into the back pressure chamber 60C through the inner-side channel 511.

As depicted in FIG. 3B, the oil flowing into the back pressure chamber 60C moves the free piston 64 toward the first side at a stretch. The free piston 64 compresses the wave washer 65 to the maximum. Then, as depicted in FIG. 3C, the volume of the back pressure chamber 60C is fixed to elevate the pressure in the back pressure chamber 60C. The spool 62 moves toward the second side to press the second valve 52 toward the second side. As a result, the flow of the oil allowing the second valve 52 to be opened is blocked.

Then, as depicted in FIG. 3C, the oil in the second oil chamber Y2 starts to flow through the extension side oil paths 411. The oil in the extension side oil paths 411 flows out into the first oil chamber Y1 while opening the extension side damping valve 42. In the present embodiment, a damping force exerted is set to be higher when the oil flows while opening the extension side damping valve 42 than when the oil flows while opening the second valve 52. Therefore, the hydraulic shock absorber 1 in the present embodiment exerts a higher damping force at the high frequency than at the low frequency.

As depicted in FIG. 1, in the bottom valve portion 70, the pressure of the oil in the second oil chamber Y2 increased by the movement of the piston portion 30 toward the second side in the axial direction is low relative to the pressure in the reservoir chamber R. As a result, the oil in the reservoir chamber R flows into the bottom extension side oil paths 712. The oil flowing through the bottom extension side oil paths 712 flows out into the first oil chamber Y1 while pushing the extension side valve 722 open.

Now, a flow of the oil during a compression stroke of the hydraulic shock absorber 1 will be described.

During the compression stroke, the piston portion 30 moves toward the first side in the axial direction of the cylinder 11. Then, the pressure in the first oil chamber Y1 rises. Then, as depicted by a dashed line in FIG. 3A, the oil in the first oil chamber Y1 flows into the compression side oil paths 412. The oil flowing through the compression side oil paths 412 flows out into the second oil chamber Y2 while opening the compression side damping valve 43. A damping force during the compression stroke is exerted by resistance resulting from the flow of the oil through the compression side oil paths 412 and the compression side damping valve 43.

As depicted in FIG. 1, in the bottom valve portion 70, the oil in the first oil chamber Y1 with the pressure of the oil increased by the movement of the piston portion 30 toward the first side in the axial direction flows through the oil holes 722R in the extension side valve 722 into the bottom compression side oil paths 711. The oil flowing through the bottom compression side oil paths 711 flows into the reservoir chamber R while pushing the compression side valve 721.

As described above, in the hydraulic shock absorber 1 in the present embodiment enables a change in the damping force to be exerted, according to the frequency of movement of the piston portion 30. In the present embodiment, the free piston 64 forms the back pressure chamber 60C along with the spool 62 and the base member 61 and is provided so as to be movable to change the volume of the back pressure chamber 60C. This configuration allows the hydraulic shock absorber 1 in the present embodiment to change the damping force to be exerted, using the simple configuration.

The free piston 64 is arranged in juxtaposition with the spool 62 in a direction crossing the axial direction, allowing for miniaturization in the axial direction. Therefore, the hydraulic shock absorber 1 is miniaturized in the axial direction.

Variation 1

Now, the hydraulic shock absorber 1 in Variation 1 will be described.

Figure 4:
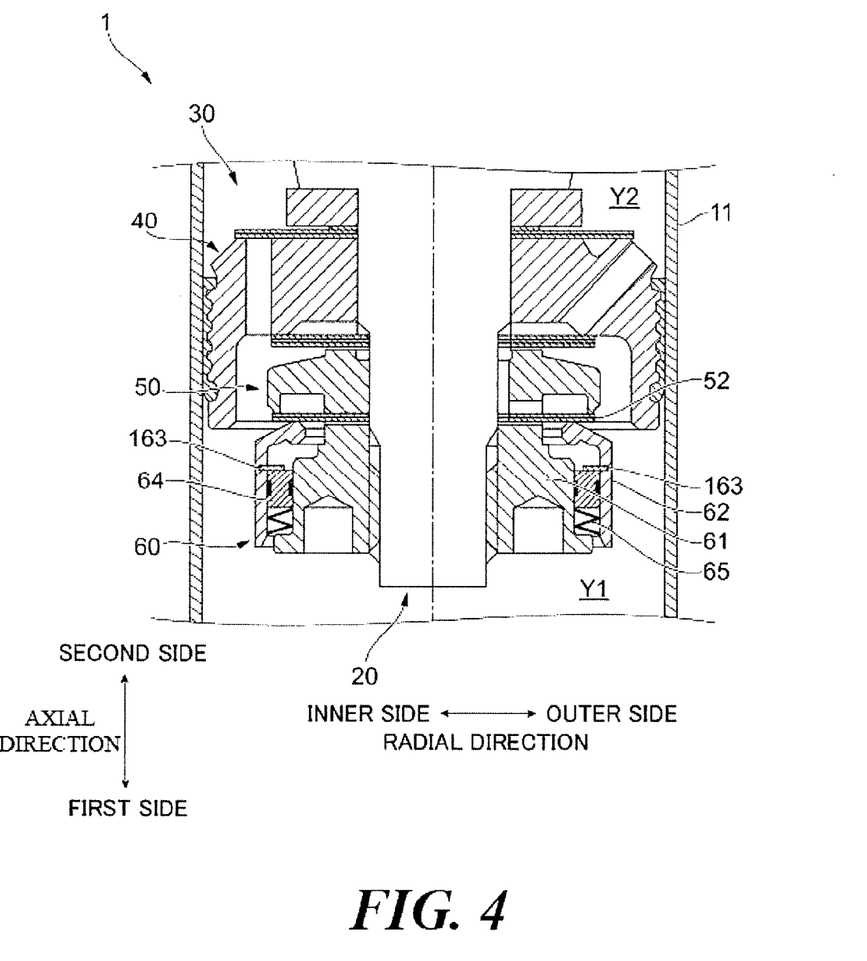
FIG. 4 is a sectional view of a piston portion in Variation 1.

FIG. 4 is a sectional view of the piston portion 30 in Variation 1.

A configuration of a stopper 163 in the damping force adjustment portion 60 in the piston portion 30 in Variation 1 is different from the configuration of the stopper 63 (see FIG. 2) in Embodiment 1. The piston portion 30 in Variation 1 does not include the preload spring 66.

As depicted in FIG. 4, in the piston portion 30 in Variation 1, the stopper 163 is fixed to the spool 62. The stopper 163 is configured to come into contact with the free piston 64 having moved toward the second side.

In the piston portion 30 in Variation 1, when the flow of the oil stops which allows the second valve 52 to be opened, the wave washer 65 moves the free piston 64 toward the second side. The free piston 64 further comes into contact with the stopper 163. As a result, the spool 62 moves toward the second side to keep the spool 62 and the second valve 52 in contact.

Thus, in the piston portion 30 in Variation 1, the wave washer 65 also functions as the preload spring 66. In other words, the piston portion 30 in Variation 1 need not necessarily have the preload spring 66.

Embodiment 2

Now, the hydraulic shock absorber 1 in Embodiment 2 will be described.

Figure 5:
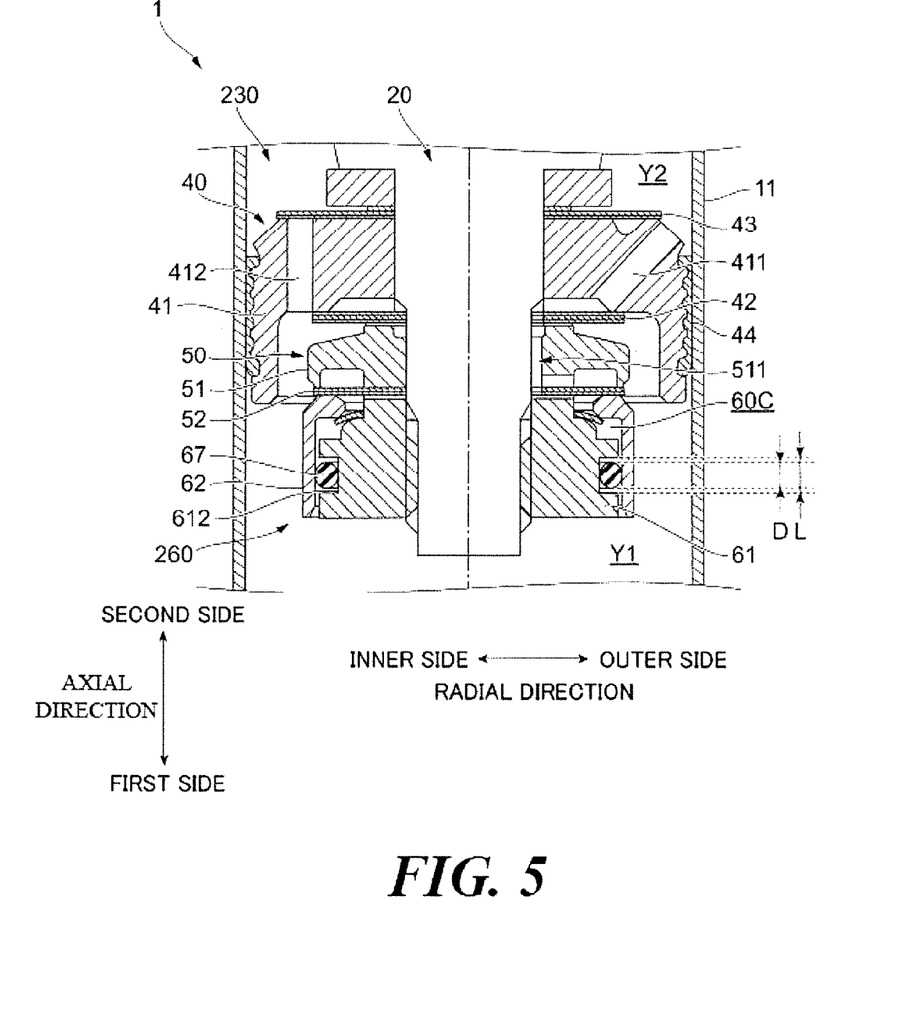
FIG. 5 is a sectional view of a piston portion in Embodiment 2.

FIG. 5 is a sectional view of the piston portion 230 in Embodiment 2.

Components of Embodiment 2 that are similar to the corresponding components of Embodiment 1 are denoted by the same reference numerals and will not be described in detail.

First, a general configuration of the hydraulic shock absorber 1 according to Embodiment 2 will be described.

As depicted in FIG. 5, the hydraulic shock absorber 1 (shock absorber) in Embodiment 2 includes the cylinder 11 (cylinder) that houses oil (liquid), the piston ring 44 (partitioning portion) provided in the cylinder 11 so as to be movable in the axial direction of the cylinder 11 and partitioning the space in the cylinder 11 into the first oil chamber Y1 (first liquid chamber) and the second oil chamber Y2 (second liquid chamber), the first valve seat 41 (first channel forming portion) that forms the extension side oil path 411 (first channel) through which the oil flows in conjunction with movement of the piston ring 44, the extension side damping valve 42 (first valve) that opens and closes the extension side oil paths 411 in the first valve seat 41, the second valve seat 51 (second channel forming portion) that forms the inner-side channel 511 (second channel) through which the oil flows separately from a flow of the oil causing the extension side damping valve 42 to open the extension side oil paths 411, the second valve 52 (second valve) that opens and closes the inner-side channel 511 in the second valve seat 51, the spool 62 (pressing portion) provided so as to be movable in contact with the second valve 52 and pressing the second valve 52 toward the inner-side channel 511, the base member 61 (holding portion) that holds the spool 62, and an O ring 67 (moving portion) that forms, between the spool 62 and the base member 61, the back pressure chamber 60C (housing chamber) that communicates with the inner-side channel 511 and that houses the oil, the O ring 67 being provided so as to be movable in the axial direction with respect to the spool 62 and the base member 61.

These components will be described below in detail.

As depicted in FIG. 5, a configuration of a damping force adjustment portion 260 in a piston portion 230 in Embodiment 2 is different from the configuration of the damping force adjustment portion 60 in Embodiment 1.

The damping force adjustment portion 260 has the base member 61, the spool 62, and the O ring 67 provided between the base member 61 and the spool 62.

In Embodiment 2, a side portion of the base member 61 that has the largest diameter has an outside diameter smaller than a bore diameter of the spool 62.

A groove portion 612 is formed in the base member 61. The groove portion 612 is formed at an outer peripheral portion of the base member 61 in a circumferential direction. The groove portion 612 has an axial length L larger than a diameter D of a section of the O ring 67 provided in the groove portion 612. In other words, the groove portion 612 holds the O ring 67 so as to make the O ring 67 movable in the axial direction of the cylinder 11.

In the present embodiment, the base member 61 may be shaped like a hollow cylinder or a solid column as long as, for example, the base member 61 allows the groove portion 612 to be formed.

An annularly formed rubber material may be used as the O ring 67. The O ring 67 is installed in the groove portion 612 of the base member 61. The O ring 67 (moving portion) is provided so as to be movable in an axial direction of the groove portion 612 and seals the base member 61 (holding portion) and the spool 62 (pressing portion) so as to eliminate the gap between the base member 61 and the spool 62.

Effects of the second piston portion 230 in Embodiment 2 will be described.

The flow of the oil through the first piston portion 40 and the second piston portion 50 in the piston portion 230 in Embodiment 2 is similar to the flow in Embodiment 1. The extension stroke will be described below by way of example.

(Low Frequency)

When the piston portion 230 moves at a low frequency, similarly to Embodiment 1 a flow of the oil that opens the second valve 52 is formed.

At the low frequency, when the oil flows into the back pressure chamber 60C, the O ring 67 moves toward the first side. In the present embodiment, the O ring 67 is compressively deformed. This consequently increases the volume of oil that can be contained in the groove portion 612 (the second side of the O ring 67). In other words, the amount of oil that can be contained in the back pressure chamber 60C is increased. As long as the state is maintained where a large volume of the oil is present in the back pressure chamber 60C, the pressure in the back pressure chamber 60C is lower than the pressure of the oil on the second side of the second valve 52. Thus, the spool 62 is moved toward the first side by the second valve 52.

At the low frequency, in the hydraulic shock absorber 1 in the present embodiment, the extension side damping valve 42 keeps the extension side oil paths 411 closed. That is, at the low frequency, a flow of the oil occurs which moves through the extension side oil paths 411 while opening the extension side damping valve 42 so as to bypass an original flow of the oil.

(High Frequency)

When the piston portion 230 moves at a high frequency, the oil flows into the back pressure chamber 60C at a stretch.

As a result, the pressure of the oil contained in the back pressure chamber 60C increases. Then, the spool 62 moves toward the second side. The spool 62 further presses the second valve 52 against the first-side end of the second valve seat 51. Thus, the flow of the oil stops which allows the second valve 52 to be opened. Then, in the present embodiment, a flow of the oil occurs which allows the extension side damping valve 42 to be opened.

In Embodiment 2, a damping force to be exerted is set higher when the oil flows while opening the extension side damping valve 42 than when the oil flows while opening the second valve 52. Therefore, the hydraulic shock absorber 1 in Embodiment 2 exerts a higher damping force at the high frequency that at the low frequency.

Variation 2

Figure 6A:
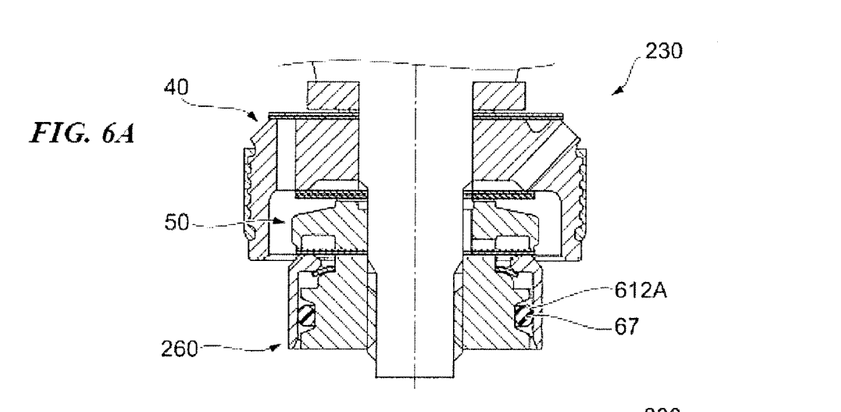
FIGS. 6A to 6C are sectional views of a piston portion in Variation 2.
Figure 6B:
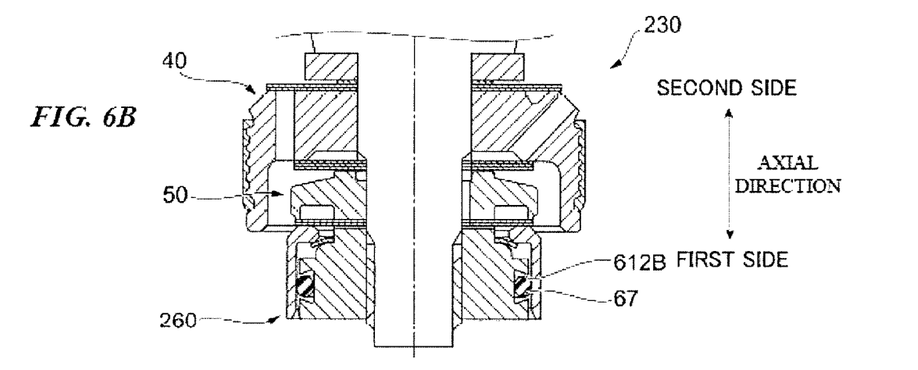
Figure 6C:
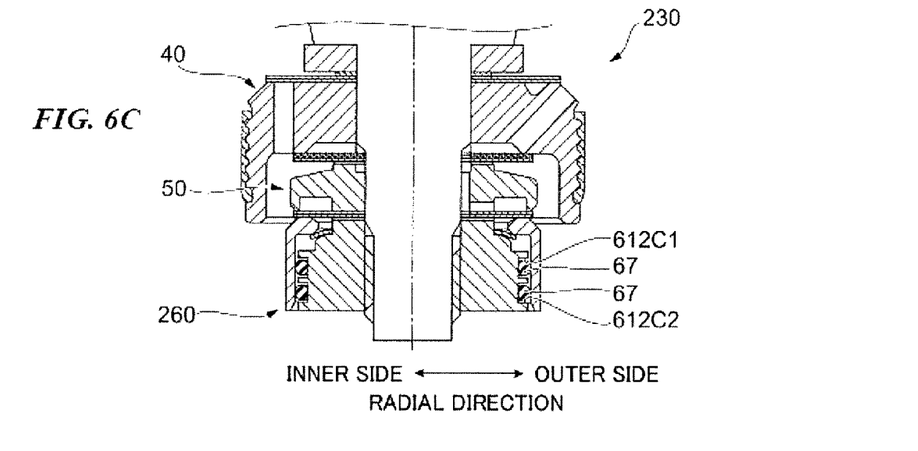

FIGS. 6A to 6C are diagrams illustrating the piston portion 230 in Variation 2.

The piston portion 230 in Variation 2 is different from the piston portion in Embodiment 2 in the shape of the groove portion 612 of the damping force adjustment portion 60.

As depicted in FIG. 6A, a groove portion 612A has a section shaped such that an axial width of the groove portion 612A gradually decreases from an outer side to an inner side of the groove portion 612 in the radial direction. In other words, the section of the groove portion 612A is shaped like a trapezoid that is larger toward the outer side in the radial direction.

As depicted in FIG. 6B, a groove portion 612B has a section shaped such that an axial width of the groove portion 612B gradually increases from an outer side to an inner side of the groove portion 612 in the radial direction. In other words, the section of the groove portion 612B is shaped like a trapezoid that is larger toward the inner side in the radial direction.

As described above, seminary to the groove portion 612A and groove portion 612B described above, the groove formed in the base member 61 may be configured to have a section shaped such that the axial width of the groove gradually increases from the outer side to the inner side of the groove in the radial direction.

As depicted in FIG. 6C, the base member 61 may have a plurality of groove portions including a first groove portion 612C1 and a second groove portion 612C2 provided on the first side of the first groove portion 612C1 away from the first groove portion 612C1.

In the piston portion 230 in Variation 2 configured as described above, the structure of the groove portion (the groove portion 612A, the groove portion 612B, the groove portion 612C1, and the groove portion 612C2) controls a displacement characteristic of the O ring 67. Thus, the behavior of the spool 62 in the piston portion 230 in the variation is different from the behavior in, for example, Embodiment 2. Thus, in the piston portion 230, a damping force characteristic is changed simply by modifying the shape of the groove. In other words, the piston portion 230 allows the damping force characteristic to be easily set.

The present embodiment uses the O ring 67 having a circular section. However, the section may have any other shape. The damping force characteristic of the piston portion 230 is easily set by changing the diameter of the section of the O ring 67, the hardness of the O ring 67, interference for the O ring 67, surface treatment (a coefficient of friction) for the O ring 67, and the like.

Embodiment 3

Now, the hydraulic shock absorber 1 to which Embodiment 3 is applied will be described.

Figure 7:
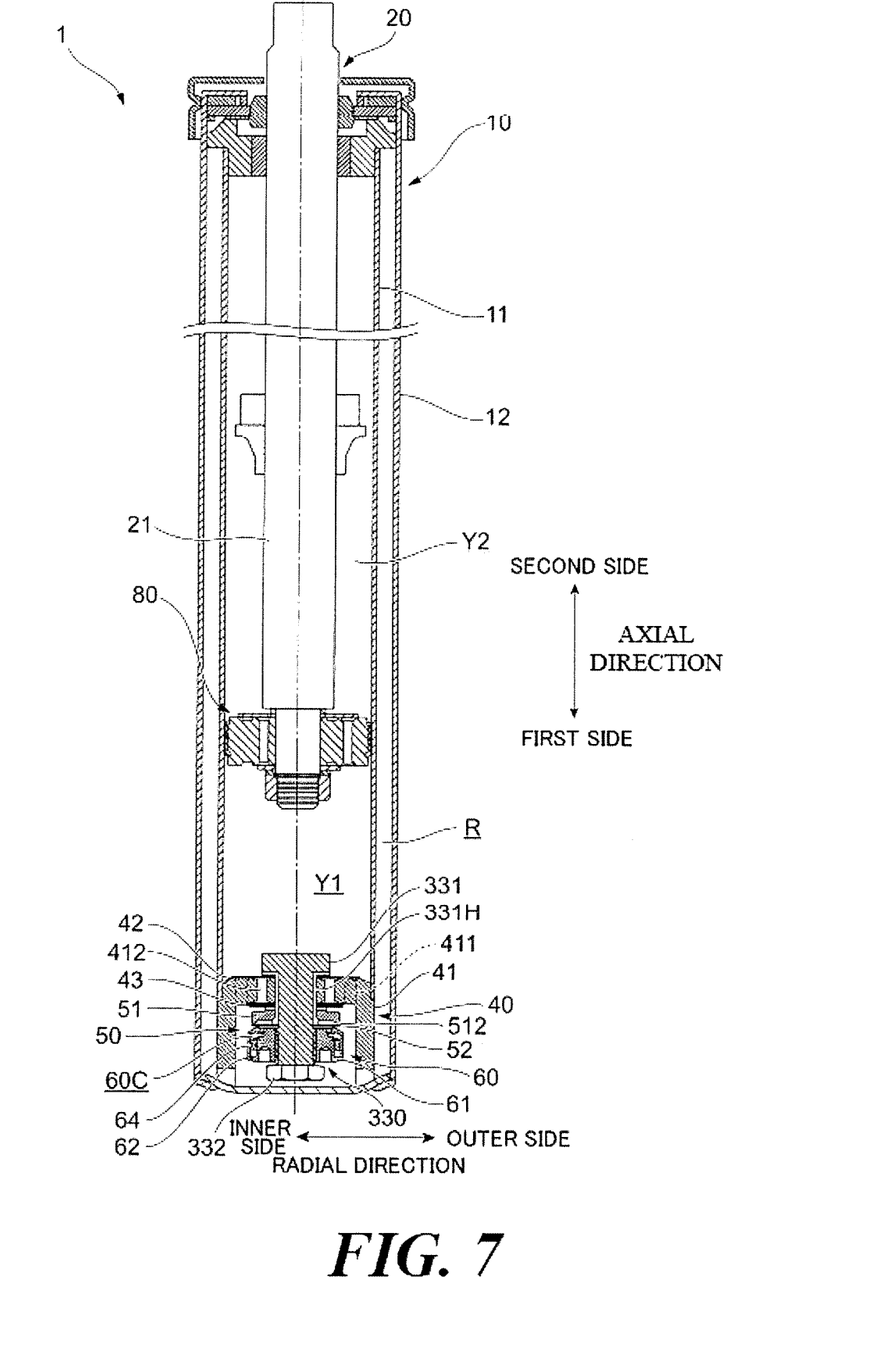
FIG. 7 is a diagram depicting a general configuration of a hydraulic shock absorber in Embodiment 3.

FIG. 7 is a diagram of a general configuration of the hydraulic shock absorber 1 in Embodiment 3.

Components of Embodiment 3 that are similar to the corresponding components of the above-described other embodiments are denoted by the same reference numerals and will not be described in detail.

First, the hydraulic shock absorber 1 according to Embodiment 3 will be described in brief.

As depicted in FIG. 7, the hydraulic shock absorber 1 (shock absorber) in Embodiment 3 includes the cylinder 11 (cylinder) that houses oil (liquid), a piston portion 80 (partitioning portion) provided in the cylinder 11 so as to be movable in the axial direction of the cylinder 11 and partitioning the space in the cylinder 11 into the first oil chamber Y1 (first liquid chamber) and the second oil chamber Y2 (second liquid chamber), the first valve seat 41 (first channel forming portion) that forms the compression side oil paths 412 (first channel) through which the oil flows in conjunction with movement of the piston portion 80, the compression side damping valve 43 (first valve) that opens and closes the compression side oil paths 412 in the first valve seat 41, a bolt 331 (second channel forming portion) that forms a bolt channel 331H (second channel) through which the oil flows separately from a flow of the oil causing the compression side damping valve 43 to open the compression side oil paths 412, the second valve 52 (second valve) that opens and closes the bolt channel 331H, the spool 62 (pressing portion) provided so as to be movable in contact with the second valve 52 and pressing the second valve 52 toward the inner-side channel 511, the base member 61 (holding portion) that holds the spool 62, and the free piston 64 (moving portion) that forms, between the spool 62 and the base member 61, the back pressure chamber 60C (housing chamber) that communicates with the bolt channel 331H and that houses the oil, the free piston 64 being provided so as to be movable in the axial direction with respect to the spool 62 and the base member 61.

As depicted in FIG. 7, the hydraulic shock absorber 1 in Embodiment 3 has the piston portion 80 instead of the piston portion 30 in Embodiment 1 and has a bottom valve portion 330 instead of the bottom valve portion 70 in Embodiment 1.

The piston portion 80 is attached to the first-side end of the rod member 21. As the rod member 21 moves toward the first side and the second side, the piston portion 80 causes a flow of the oil between the first oil chamber Y1 and the second oil chamber Y2 and between the first oil chamber Y1 and the reservoir chamber R.

The bottom valve portion 330 has the same basic configuration as that of the piston portion 30 in Embodiment 1. The bottom valve portion 330 is fixed to the first-side end of the cylinder 11.

In the bottom valve portion 330, the damping force adjustment portion 60, the first piston portion 40, and the second piston portion 50 are held by a bolt 331 and a nut 332. The bolt 331 in Embodiment 3 has the bolt channel 331H. The bolt channel 331H communicates with the second annular recessed portion 512 on a first side thereof and with the first oil chamber Y1 on a second side thereof.

Also in the hydraulic shock absorber 1 in Embodiment 3 configured as described above, the bottom valve portion 330 exerts a damping force that acts on the flow of the oil occurring between the first oil chamber Y1 and the reservoir chamber R in conjunction with movement of the piston portion 80. The bottom valve portion 330 with the simple configuration enables a change in the damping force to be exerted.

In Embodiment 3, the bolt channel 331H in the bolt 331 forms a channel different from the channel for the flow of the oil that causes the compression side damping valve 43 to open the compression side oil paths 412. However, the present invention is not limited to this aspect. For example, similarly to Example 1 the compression side oil paths 412 may be utilized to form a channel different from the channel for the flow of the oil that causes the compression side damping valve 43 to open the compression side oil paths 412.

Variation 3

Figure 8:
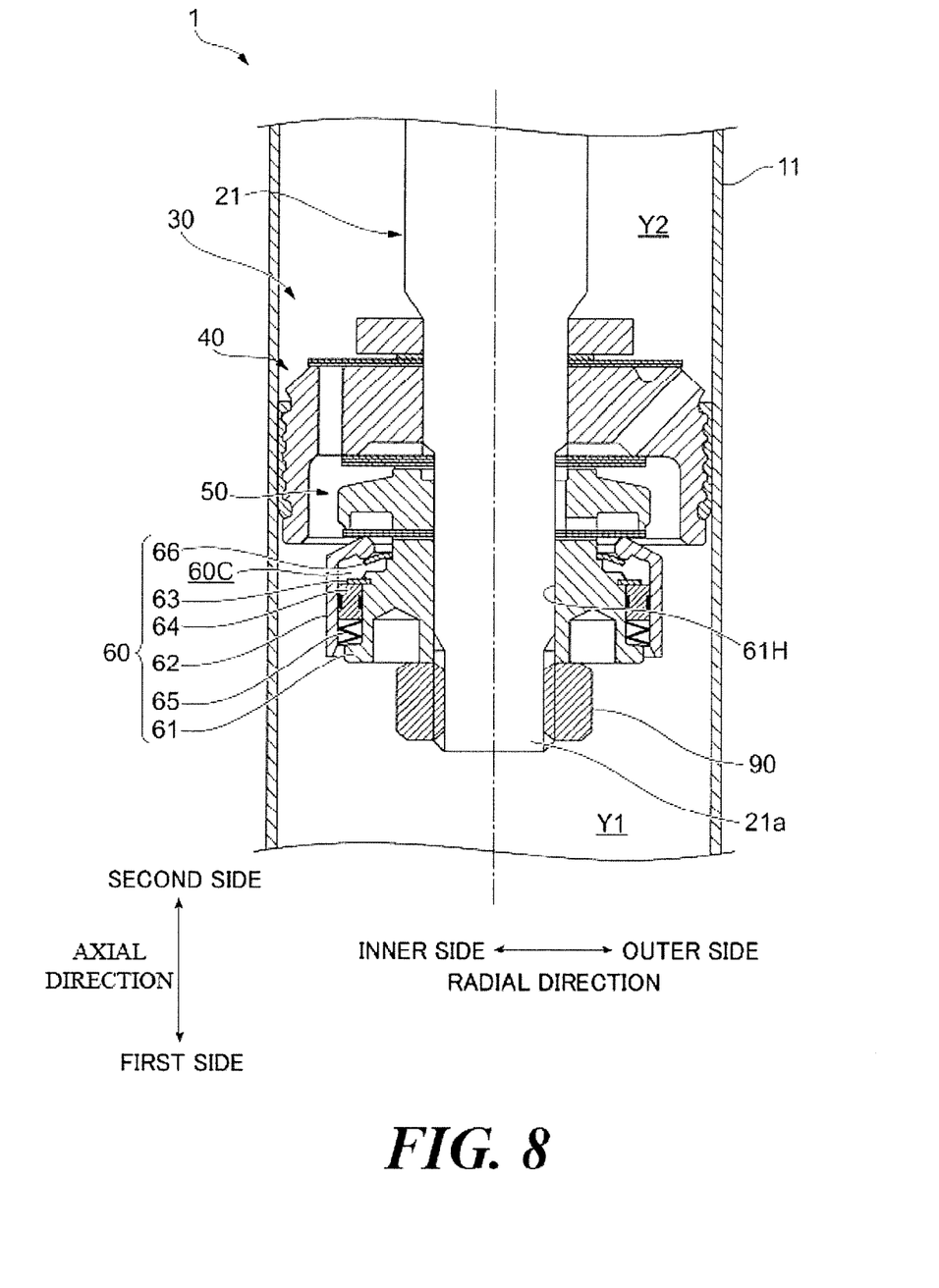
FIG. 8 is a sectional view of a piston portion in Variation 3.

FIG. 8 is a sectional view of the piston portion 30 in a variation.

The piston portion 30 in Variation 3 has a basic configuration similar to the basic configuration in Embodiment 1. However, the piston portion 30 in Variation 3 is different from the piston portion 30 in Embodiment 1 in a structure that clamps the piston portion 30 to the rod member 21.

The piston portion 30 in Variation 3 has a nut 90 on the first side of the base member 61. The nut 90 connects to an external thread formed on the first-side attachment portion 21a of the rod member 21. The base member 61 in Variation 3 has no internal thread inside the through-hole 61H and is formed to be straight.

In the piston portion 30 in Variation 3 configured as described above, the nut 90 allows the rod member 21 to hold the damping force adjustment portion 60, the first piston portion 40, and the second piston portion 50. Forming, for example, an internal thread on the base member 61 is not needed, allowing formation of the base member 61 by sintering and omission of machining for formation of an internal thread and the like. Thus, manufacturing costs are reduced.

In Embodiments 1 to 3, the configuration in which the piston portion 30 (piston portion 230) and the bottom valve portion 330 are provided in the cylinder 11 has been described. However, the present invention is not limited to the provision of these components in the single cylinder 11. That is, a housing portion in which the oil is contained is provided separately from the cylinder 11. Then, the piston portion 30 (piston portion 230) is provided inside the housing portion. When the oil flows between the first oil chamber Y1 and the second oil chamber Y2 as a result of movement of the rod member 21 in the axial direction, a damping force may be exerted in the housing portion and changed.

In the hydraulic shock absorbers 1 in Embodiments 1 to 3, the damping force exerted on the extension side damping valve 42 using the damping force adjustment portion 60 is adjusted. However, the present invention is not limited to this aspect. For example, the damping force adjustment portion 60 may be similarly provided for the compression side damping valve 43 to change the damping force to be exerted. Moreover, the damping force adjustment portion 60 may be provided for each of the extension side damping valve 42 and the compression side damping valve 43. Also in this case, the configuration of the hydraulic shock absorber 1 is simplified, and the hydraulic shock absorber 1 is miniaturized in the axial direction.

The hydraulic shock absorbers 1 in Embodiments 1 to 3 have what is called a double pipe structure. However, the present invention is not limited to this aspect. For example, the hydraulic shock absorbers 1 in Embodiments 1 to 3 may have a triple pipe structure. Moreover, Embodiments 1 to 3 may be applied to a single pipe structure that is what is called a mono tube structure.

The bottom valve portion 70 in Embodiments 1 and 2 and the piston portion 80 in Embodiment 3 are not limited to the structures disclosed in the embodiments. The bottom valve portion 70 and the piston portion 80 may have any other shapes and configurations so long as the bottom valve portion 70 and the piston portion 30 function as a damping mechanism.

What is claimed is:

1. A shock absorber comprising:
a cylinder housing a liquid;
a partitioning portion provided in the cylinder so as to be movable in an axial direction of the cylinder and partitioning a space in the cylinder into a first liquid chamber and a second liquid chamber;
a first channel forming portion forming a first channel through which the liquid flows in conjunction with movement of the partitioning portion;
a first valve opening and closing the first channel in the first channel forming portion;
a second channel forming portion forming a second channel through which the liquid flows separately from a flow of the liquid causing the first valve to open the first channel in conjunction with movement of the partitioning portion;
a second valve opening and closing the second channel in the second channel forming portion;
a pressing portion provided so as to be movable in contact with the second valve and presses the second valve toward the second channel;
a holding portion holding the pressing portion;
a moving portion, that is provided between the pressing portion and the holding portion so as to be movable in the axial direction with respect to the pressing portion and the holding portion; and
a housing chamber that communicates with the second channel and houses the liquid, wherein
the housing chamber is defined by an inner surface of the pressing portion and an upper surface of the moving portion facing toward the second channel.

2. The shock absorber according to claim 1, wherein
the moving portion is arranged in juxtaposition with the pressing portion in a direction crossing the axial direction.

3. The shock absorber according to claim 1, wherein
the first valve has an opening through which the liquid flows, and
the second channel communicates with the first channel via the opening.

4. The shock absorber according to claim 1, wherein
the pressing portion is formed in a cylindrical shape, and
the moving portion is formed in a ring shape and arranged between an outer side of the holding portion and an inner side of the pressing portion.

5. The shock absorber according to claim 1, wherein
the holding portion is formed in a cylindrical shape or a columnar shape and has a groove portion formed at an outer peripheral portion of the holding portion in a circumferential direction, and
the moving portion is a circular sealing member provided so as to be movable in the axial direction in the groove portion and sealing the holding portion and the pressing portion so as to eliminate a gap therebetween.

6. The shock absorber according to claim 5, wherein
the groove portion has an axial width changing from the outer side to an inner side of the holding portion.

7. The shock absorber according to claim 1, wherein
the holding portion has a lower protrusion that protrudes in a radial direction of the cylinder at a lower end thereof and receives the moving portion,
a volume of the liquid in the housing chamber changes in accordance with a position of the moving portion, and
the moving portion is positioned away from the lower protrusion of the holding portion unless the volume becomes maximum.

8. The shock absorber according to claim 1, wherein the moving portion is made of metal.

9. The shock absorber according to claim 1, wherein the moving portion is configured to move freely and is spaced from and free of contact with both the first and second valves.

10. The shock absorber according to claim 1, wherein
a first side wall of the moving portion is in continued contact with the pressing portion and a second side wall of the moving portion is in continued contact with the holding portion during movement in the axial direction.

11. The shock absorber according to claim 1, further including a stopper that extends radially inward from the pressing portion and serves to limit a degree of travel of the moving portion.

12. The shock absorber according to claim 11, wherein the moving portion is disposed between the stopper and a compressible member.

\* \* \* \* \*